(12) United States Patent
Lin et al.

(10) Patent No.: US 7,353,524 B1
(45) Date of Patent: Apr. 1, 2008

(54) DISK DRIVE WITH AIRFLOW CHANNELING ENCLOSURE

(75) Inventors: Jen-Tai Lin, Fremont, CA (US); Jin Hui Ou-Yang, San Jose, CA (US); Chiao-Ping Ku, Fremont, CA (US); Robert J. McNab, San Jose, CA (US); Shuo-Hao Chen, Cupertino, CA (US); Lin Yang, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 556 days.

(21) Appl. No.: 10/877,746

(22) Filed: Jun. 25, 2004

(51) Int. Cl.
*G11B 33/14* (2006.01)

(52) U.S. Cl. ..................................................... 720/633

(58) Field of Classification Search .................... None
See application file for complete search history.

(56) References Cited

U.S. PATENT DOCUMENTS

| | | | | |
|---|---|---|---|---|
| 4,008,492 A * | 2/1977 | Elsing | ..................... | 360/97.03 |
| 4,581,668 A * | 4/1986 | Campbell | ..................... | 369/72 |
| 4,583,213 A * | 4/1986 | Bracken et al. | ............. | 369/261 |
| 4,780,776 A * | 10/1988 | Dushkes | ................... | 360/78.12 |
| 5,406,431 A * | 4/1995 | Beecroft | .................. | 360/97.02 |
| 6,369,978 B1 * | 4/2002 | Shimizu et al. | .......... | 360/97.03 |
| 6,507,452 B1 | 1/2003 | Bae et al. | | |
| 6,549,365 B1 | 4/2003 | Severson | | |
| 6,560,066 B2 * | 5/2003 | Imai et al. | ............... | 360/97.02 |
| 6,636,379 B2 | 10/2003 | Rannow et al. | | |
| 6,654,201 B2 | 11/2003 | Smith | | |
| 6,665,139 B2 | 12/2003 | Tokuyama et al. | | |
| 6,728,062 B1 | 4/2004 | Ou-Yang et al. | | |
| 6,765,751 B2 * | 7/2004 | Huang et al. | ............ | 360/97.01 |
| 6,791,790 B2 | 9/2004 | Lee | | |
| 6,876,514 B1 | 4/2005 | Little | | |
| 6,894,867 B2 | 5/2005 | Hong et al. | | |
| 6,898,048 B2 * | 5/2005 | Adams et al. | ........... | 360/97.02 |
| 6,930,856 B2 | 8/2005 | Wang et al. | | |
| 6,971,790 B2 | 12/2005 | Quinn et al. | | |
| 6,980,392 B2 | 12/2005 | Pierson | | |
| 6,999,273 B2 * | 2/2006 | Tsang et al. | ............. | 360/97.02 |
| 7,002,774 B2 | 2/2006 | Adams | | |
| 7,057,850 B2 | 6/2006 | Hong et al. | | |
| 2003/0081350 A1 * | 5/2003 | Wang et al. | ............. | 360/97.02 |
| 2003/0137769 A1 * | 7/2003 | Wang et al. | ............. | 360/97.02 |
| 2003/0231424 A1 | 12/2003 | Hong et al. | | |
| 2005/0185325 A1 | 8/2005 | Hur | | |

* cited by examiner

*Primary Examiner*—Hoa T. Nguyen
*Assistant Examiner*—Mark Blouin
(74) *Attorney, Agent, or Firm*—Stetina, Brunda, Garred & Brucker

(57) ABSTRACT

A disk drive includes a disk drive base, a disk, and a head stack assembly rotatably coupled to the base adjacent the disk surface of the disk. The disk drive includes an airflow channeling enclosure. The enclosure includes an airflow inlet disposed downstream of the head stack assembly and configured to receive the disk rotation induced airflow therethrough. The enclosure further includes an airflow channel extending along the disk surface from the airflow inlet. The enclosure further includes an outer wall extending along the disk surface from the airflow inlet and defining the airflow channel radially interior to the outer wall. The enclosure further includes an airflow outlet disposed upstream of the head stack assembly extending from the outer wall and the channel opposite the airflow inlet for modifying the disk rotation induced airflow passing from the channel.

21 Claims, 4 Drawing Sheets

DISK DRIVE WITH AIRFLOW CHANNELING ENCLOSURE

BACKGROUND OF THE INVENTION

1. Field of the Invention

The present invention relates generally to disk drives, and in particular to a disk drive including an airflow channeling enclosure.

2. Description of the Prior Art

The typical hard disk drive includes a head disk assembly (HDA) and a printed circuit board assembly (PCBA) attached to a disk drive base of the HDA. The head disk assembly includes the disk drive base, a cover, at least one magnetic disk, a spindle motor for rotating the disk, and a head stack assembly (HSA) that includes a transducer head supported by a slider (collectively referred to as "head" or "slider") for reading and writing data from and to the disk.

The spindle motor includes a spindle motor hub that is rotatably coupled to the disk drive base. The spindle motor hub has an outer hub flange that supports a lowermost one of the disks. Additional disks may be stacked and separated with annular disk spacers that are disposed about the spindle motor hub. The spindle motor typically includes a spindle motor base that is attached to the disk drive base. A shaft is coupled to the spindle motor base and the spindle motor hub surrounds the shaft. The spindle motor hub may be rotatably coupled to the shaft and therefore the spindle motor base typically via a pair of bearing sets. A stator is positioned about the shaft and is attached to the spindle motor base. A magnet element is attached to the hub flange. The stator includes windings that selectively conduct current to create a magnetic field that interacts with the various poles of the magnet element. Such interaction results in forces applied to the spindle motor hub that tend to rotate the spindle motor hub and the attached disks.

The printed circuit board assembly includes a servo control system in the form of a disk controller for generating servo control signals. The head stack assembly is controllably positioned in response to the generated servo control signals from the disk controller. In so doing, the attached sliders are moved relative to tracks disposed upon the disk.

The head stack assembly includes an actuator assembly including the sliders and a flex circuit cable assembly attached to the actuator assembly. A conventional "rotary" actuator assembly (also referred to as "rotary actuator" or simply "actuator") typically comprises an actuator body, a pivot bearing cartridge, a coil portion that extends from one side of the actuator body to interact with one or more permanent magnets to form a voice coil motor, and one or more actuator arms which extend from an opposite side of the actuator body to a distal end of the actuator assembly. The actuator body includes a bore and the pivot bearing cartridge engaged within the bore for allowing the actuator body to rotate between limited positions. At least one head gimbal assembly (HGA) is distally attached to each of the actuator arms. Each head gimbal assembly biases a head towards the disk. In this regard, the actuator assembly is controllably rotated so as to move the heads relative to the disks for reading and writing operations with respect to the tracks contained on the disks.

A topic of concern is the desire to reduce the effects of airflow generated within the disk drive due to rotation of the disks. Of particular concern is the occurrence of turbulent airflow which may tend to excite a resonance response of the actuator assembly. This results in an increase in the percent off-track values of the associated head. Further, such disk rotation induced airflow may result in a force applied to the actuator assembly, i.e., windage. In addition, such disk rotation induced airflow may result in vibration of the disks or disk flutter.

Another topic of concern is contamination within the disk drive, and in particular, the rate and efficiency of filtering contamination. Various airflow circulation filtering systems have been utilized in the art with varying degrees of effectiveness. A typical arrangement is to provide a vertically disposed rectangular filter within a cavity of the disk drive.

Accordingly, there is a need in the art for an improved disk drive configuration for filtering and mitigation of disk rotation induced airflow in comparison to the prior art.

SUMMARY OF THE INVENTION

According to an aspect of the present invention, there is provided a disk drive. The disk drive includes a disk drive base, and a disk rotatably coupled to the disk drive base. The disk includes a disk surface and defines an axis of rotation. The disk drive further includes a head stack assembly rotatably coupled to the disk drive base adjacent the disk surface. The disk drive further includes an airflow channeling enclosure disposed adjacent to and spaced apart from the disk surface. The airflow channeling enclosure includes an airflow inlet disposed downstream of the head stack assembly with respect to disk rotation induced airflow and configured to receive the disk rotation induced airflow therethrough. The airflow channeling enclosure further includes an airflow channel extending along the disk surface from the airflow inlet. The airflow channeling enclosure further includes an outer wall extending along the disk surface from the airflow inlet and defining the airflow channel radially interior to the outer wall with respect to the disk. The airflow channeling enclosure further includes an airflow outlet disposed upstream of the head stack assembly extending from the outer wall and the airflow channel opposite the airflow inlet for modifying the disk rotation induced airflow passing from the airflow channel.

According to various embodiments, the airflow channeling enclosure may include a first plate disposed parallel to and along the disk surface. The first plate extends from the outer wall radially interior with respect to the disk and extends between the airflow inlet and the airflow outlet to further define the airflow channel. The airflow channeling enclosure may include a second plate disposed parallel to the first plate. The second plate extends from the outer wall radially interior with respect to the disk with the outer wall being between the first and second plates, and the second plate extends between the airflow inlet and the airflow outlet to further define the airflow channel. The first plate may be formed of a solid material, such as a plastic material.

In addition, the airflow channeling enclosure may include an outlet filter disposed across the airflow outlet. The airflow channeling enclosure may include an inner wall extending along the disk surface from the airflow inlet and defining the airflow channel radially exterior to the inner wall with respect to the disk. The inner wall may be formed of a filter material for modifying the disk rotation induced airflow exiting the channel through the inner wall. The airflow channeling enclosure may include an outlet filter disposed across the airflow outlet with the outlet filter being formed of a filter material having a porosity finer than a porosity of the filter material of the inner wall. The disk may include an outer edge, and the outer wall may extend adjacent the outer edge. The outer wall may be formed of a solid material. The airflow channeling enclosure may extend in an arc at least 180 degrees with respect to the axis of rotation of the disk.

According to another aspect of the present invention, there is provided a disk drive. The disk drive includes a disk drive base, and a disk rotatably coupled to the disk drive base. The disk includes a disk surface and defines an axis of rotation. The disk drive further includes a head stack assembly rotatably coupled to the disk drive base adjacent the disk surface. The disk drive further includes an airflow channeling enclosure disposed adjacent to and spaced apart from the disk surface. The airflow channeling enclosure includes an open airflow inlet configured to receive the disk rotation induced airflow therethrough. The airflow channeling enclosure further includes an airflow channel extending along the disk surface from the airflow inlet. The airflow channeling enclosure further includes an outer wall extending along the disk surface from the airflow inlet and defining the airflow channel radially interior to the outer wall with respect to the disk. The airflow channeling enclosure further includes an airflow outlet disposed upstream of the head stack assembly extending from the outer wall and the airflow channel opposite the airflow inlet for modifying the disk rotation induced airflow passing from the airflow channel.

DESCRIPTION OF THE PREFERRED EMBODIMENTS

Figure 1:
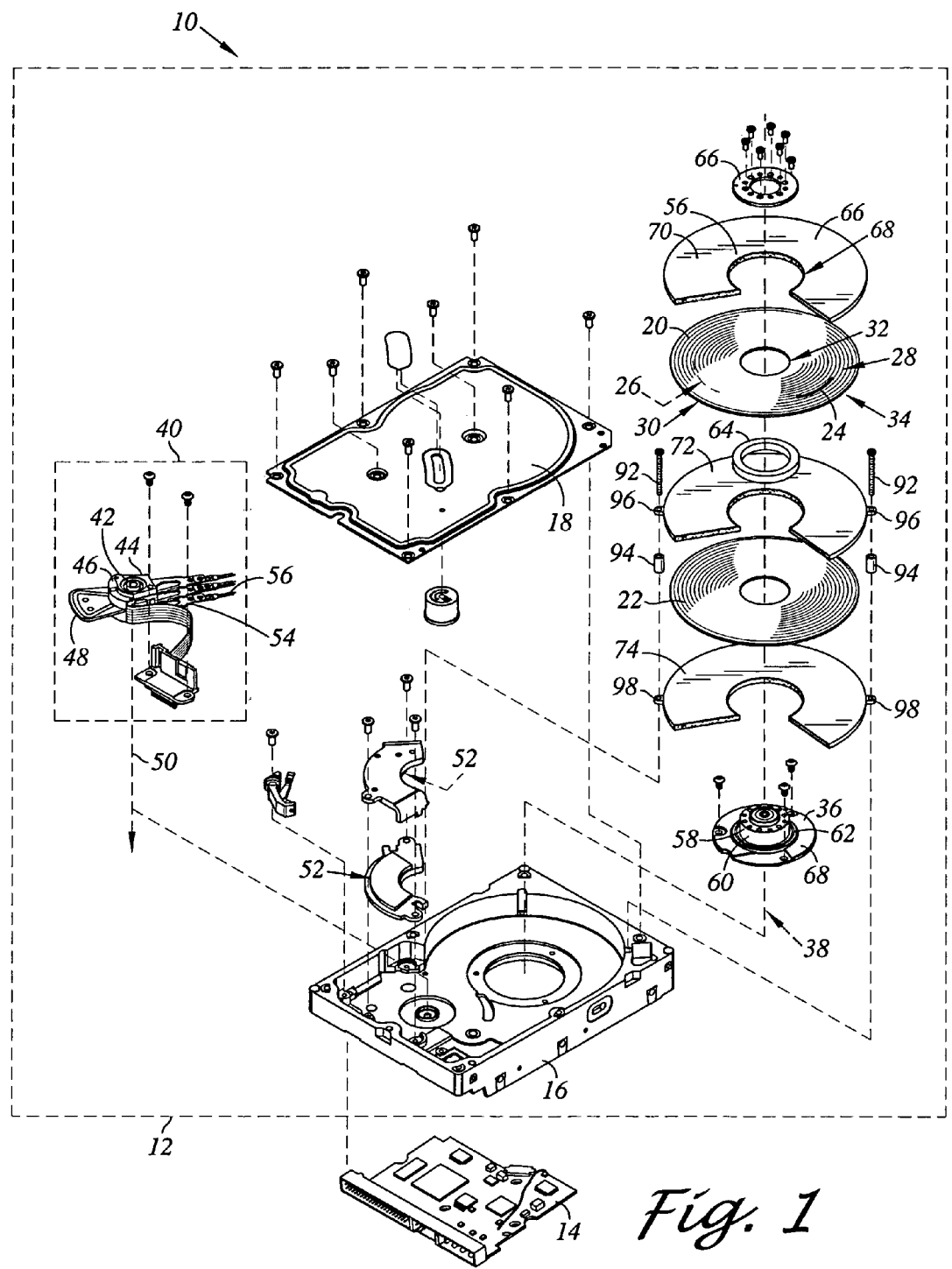
FIG. 1 is an exploded perspective view of a disk drive.

Referring now to the drawings wherein the showings are for purposes of illustrating preferred embodiments of the present invention only, and not for purposes of limiting the same, FIGS. 1-6 illustrate a disk drive including airflow channeling enclosures in accordance with aspects of the present invention.

Referring now to FIG. 1 there is depicted an exploded perspective view of a disk drive 10 constructed in accordance with an aspect of the present invention. In the embodiment shown, the disk drive 10 includes a head disk assembly (HDA) 12 and a printed circuit board assembly (PCBA) 14. The head disk assembly 12 includes a housing which may include a disk drive base 16 and a cover 18 that collectively house magnetic disks 20, 22. Each magnetic disk 20, 22 contains a plurality of tracks for storing data. The disks 20, 22 may be two-sided, and thus for example, the magnetic disk 20 is shown having a track 24 on an upper disk surface 28 and a track 26 (shown in phantom) on a lower disk surface 30. The disks 20, 22 each include an inner edge 32 and an outer edge 34.

The head disk assembly 12 further includes a spindle motor 36 for rotating the magnetic disks 20, 22 about an axis of rotation 38. The head disk assembly 12 further includes a head stack assembly 40 and a pivot bearing cartridge 42. The head stack assembly 40 includes a rotary actuator 44. The rotary actuator 44 includes an actuator body 46 that has a bore and the pivot bearing cartridge 42 is engaged within the bore for facilitating the rotary actuator 44 to rotate between limited positions. The rotary actuator 44 further includes a coil portion 48 that extends from one side of the actuator body 46. The coil portion 48 includes a coil that is configured to interact with a pair of permanent magnets 52 to form a voice coil motor for pivoting the rotary actuator 44 about a pivot axis 50.

A plurality of actuator arms, the lowermost one of which being denoted 54, extends from an opposite side of the actuator body 46. As the disks 20, 22 may be two-sided, each of the actuator arms includes either one or two head gimbal assemblies associated with the adjacent sides of the disks 20, 22. Each head gimbal assembly includes an air bearing slider or slider (the lowermost one being denoted 56). Each air bearing slider 56 is contemplated to include a transducer head for reading and writing data from and to the disks 20, 22.

The spindle motor 36 includes a spindle motor hub 58 that is rotatably attached to the disk drive base 16. The spindle motor hub 58 has a hub body 60 and a hub flange 62 that extends from the hub body 60. The hub flange 62 includes a supporting surface for supporting a lowermost one of the disks, namely disk 22. The remaining disk 20 is stacked on disk 22 and separated with an annular disk spacer 64 that is disposed about the hub body 60. A disk clamp 66 is attached about the spindle motor hub 58 and is utilized to apply a clamping force against the topmost disk 20 for securing all the disks 20, 22 to the spindle motor hub 58. The spindle motor 36 may further include a spindle motor base 68 that is mounted to the disk drive base 16.

As will be discussed in further detail below, in the embodiment shown, the disk drive 10 includes airflow channeling enclosures 70, 72, 74 which are generally configured to modify and filter disk rotation induced airflow within the disk drive 10. It is understood that such airflow diverter filter components 70, 72, 74 represent various aspects of the present invention and that the invention may be practiced with any one of such components 70, 72, 74 or in combination such as shown in this particular embodiment.

Figure 4:
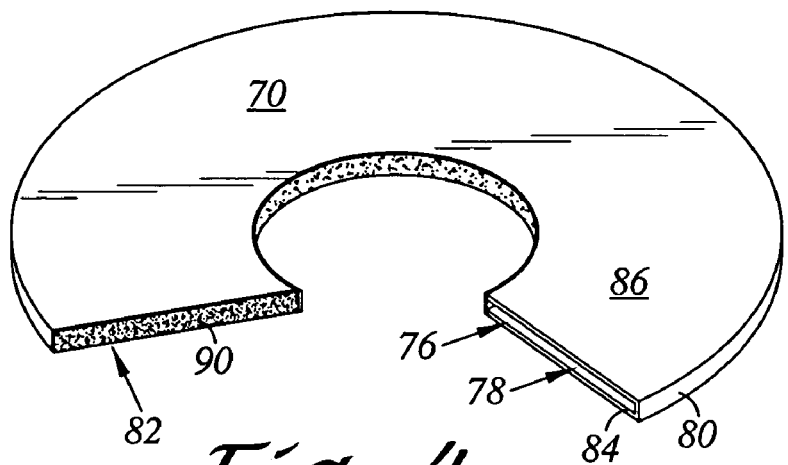
FIG. 4 is an enlarged perspective view of the airflow channeling enclosure.
Figure 5:
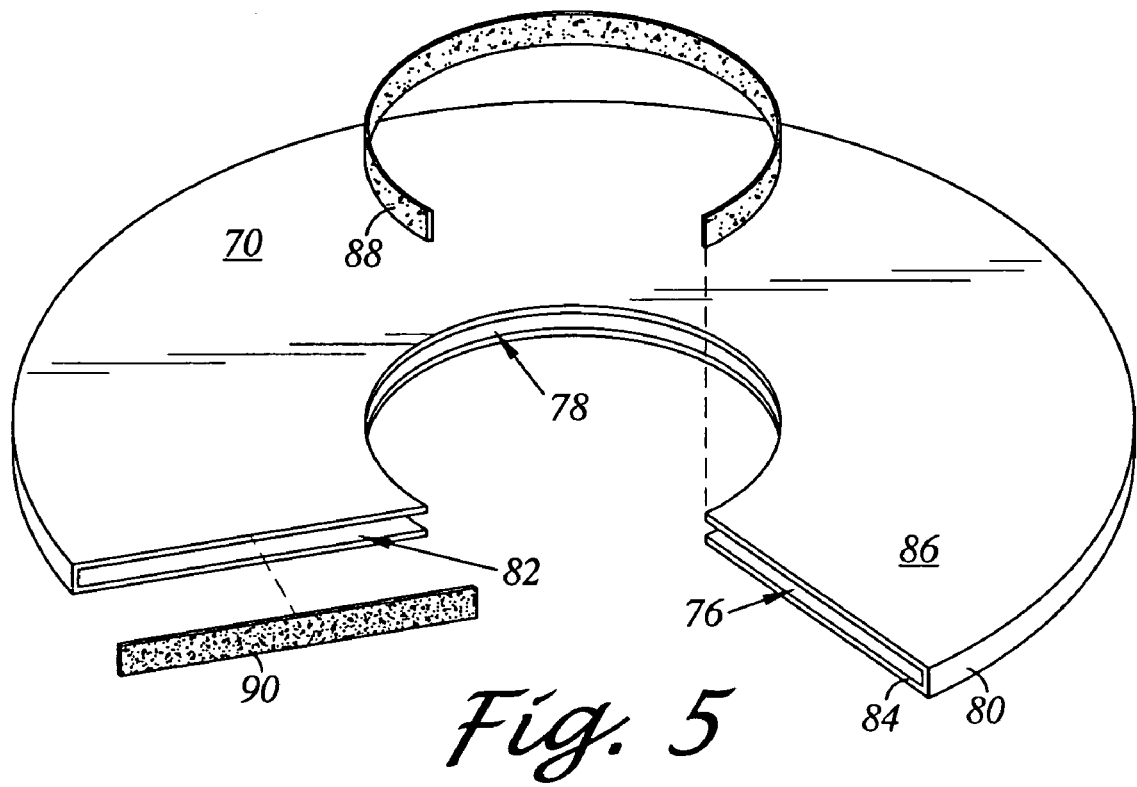
FIG. 5 is an exploded perspective view of the airflow channeling enclosure.

Referring now to FIG. 1 there is depicted an exploded perspective view of the disk drive 10. An enlarged perspective view of the assembled disk drive 10 is shown without the cover 18 in FIG. 2. FIG. 3 depicted an enlarged plan view of selected components of the disk drive of FIG. 2 including the airflow channeling enclosure 70, the disk 20, and the head stack assembly 40. An enlarged perspective view of the airflow channeling enclosure 70 is shown in FIG. 4, and an exploded perspective view of the airflow channeling enclosure 70 is shown in FIG. 5.

According to an aspect of the present invention, there is provided the disk drive 10. The disk drive 10 includes the disk drive base 16, and a disk, such as disk 20, rotatably coupled to the disk drive base 16. The disk 20 includes a disk surface, such as the upper disk surface 28, and defines the axis of rotation 38. The disk drive 10 further includes the head stack assembly 40 rotatably coupled to the disk drive base 16 adjacent the disk surface 28. The disk drive 10 further includes an airflow channeling enclosure, such as the airflow channeling enclosure 70, disposed adjacent to and spaced apart from the disk surface 28. The airflow channeling enclosure 70 includes an airflow inlet 76 disposed downstream of the head stack assembly 40 with respect to disk rotation induced airflow and configured to receive the disk rotation induced airflow therethrough. The airflow channeling enclosure 70 further includes an airflow channel 78 extending along the disk surface 28 from the airflow inlet 76. The airflow channeling enclosure 70 further includes an outer wall 80 extending along the disk surface 28 from the airflow inlet 76 and defining the airflow channel 78 radially interior to the outer wall 80 with respect to the disk 20. The airflow channeling enclosure 70 further includes an airflow outlet 82 disposed upstream of the head stack assembly 40 extending from the outer wall 80 and the airflow channel 78 opposite the airflow inlet 76 for modifying the disk rotation induced airflow passing from the airflow channel 78.

Figure 2:
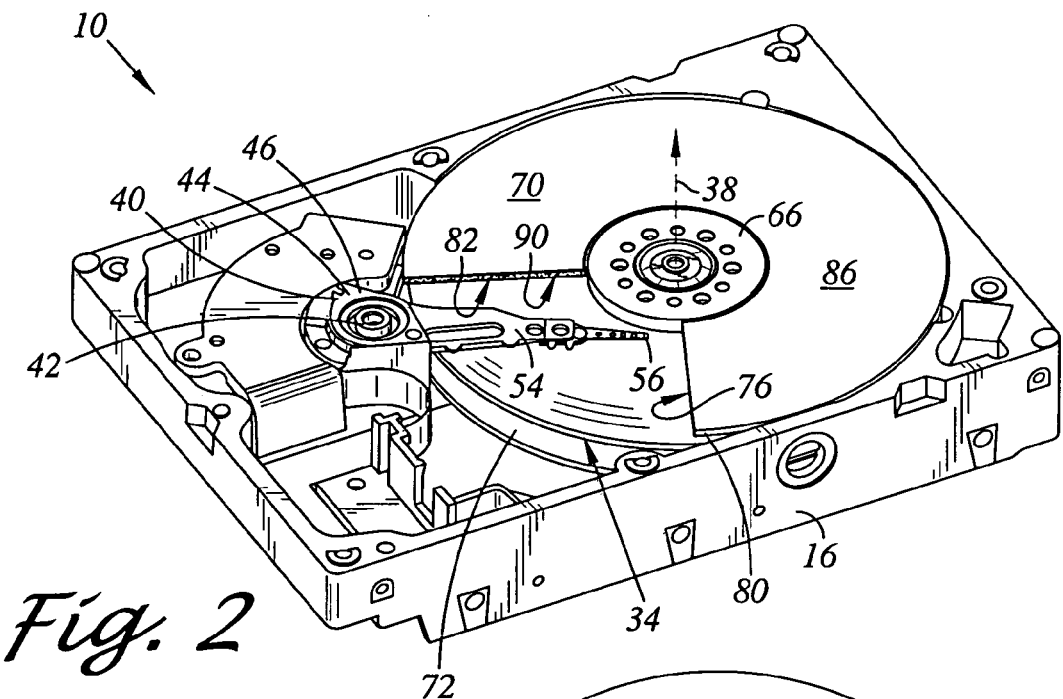
FIG. 2 is an enlarged perspective view of the disk drive (without a cover) of FIG. 1 as shown assembled with a topmost airflow channeling enclosure of an aspect of the present invention.
Figure 3:
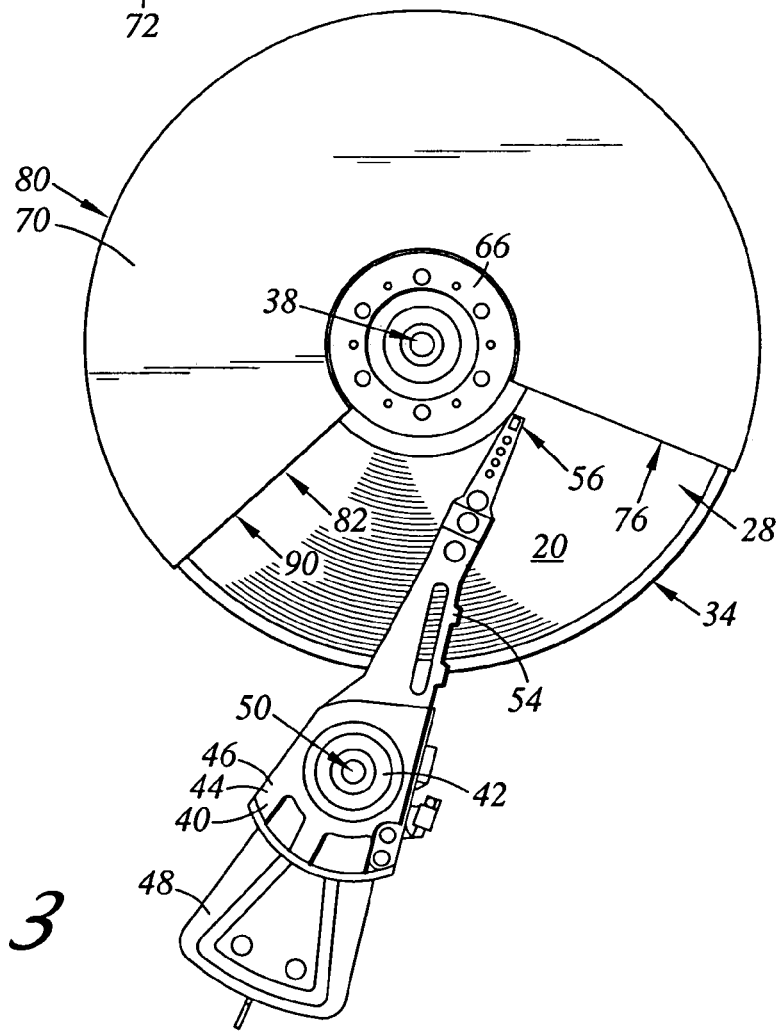
FIG. 3 is an enlarged plan view of selected components of the disk drive of FIG. 2 including the airflow channeling enclosure, a disk and a head stack assembly.

In further detail, in the views of FIGS. 1-3, the disks 20, 22 are configured to rotate in a counter-clockwise direction. As such, the airflow inlet 76 receives disk rotation induced airflow downstream of the head stack assembly 40 and channels it through the airflow channeling enclosure 70 in the airflow channel 80.

It is contemplated that disk rotation induced airflow that may result in vibration of the disks 20, 22 or disk flutter. As such, utilization of the airflow channeling enclosures 70, 72, 74 may generally reduce disk rotation induced airflow and therefore may mitigate disk flutter. This is especially the case with this particular aspect of the invention with the airflow inlet 76 being disposed downstream of the head stack assembly 40 and the airflow outlet 82 being disposed upstream of the head stack assembly 40. In this regard, in this embodiment, the airflow channeling enclosure 70 provides coverage adjacent the disk 20 from downstream of the head stack assembly 40 to upstream of the head stack assembly 40. Additionally, the airflow channeling enclosure 70 may extend in an arc at least 180 degrees with respect to the axis of rotation 38 of the disk 20, such as it the case with the particular embodiment shown.

As used herein the terms upstream and downstream refer to regions bisected by a plane that includes the pivot axis 50 associated with the head stack assembly 40 and the axis of rotation 38 associated with the spindle motor 36 and the disks 20, 22. In the plan view of FIG. 3, as the disks 20, 22 are configured to rotate counter-clockwise, the region to the right of a line through the pivot axis 50 and the axis of rotation 38 would be considered to be downstream of the head stack assembly 40, and the region to the left of such line would be considered to be upstream of the head stack assembly 40.

In this embodiment, the airflow channeling enclosure 70 includes a first plate 84 disposed parallel to and along the disk surface 28. The first plate 84 extends from the outer wall 80 radially interior with respect to the disk 20 and extends between the airflow inlet 76 and the airflow outlet 82 to further define the airflow channel 78. In addition, the airflow channeling enclosure 70 may include a second plate 86 disposed parallel to the first plate 84. The second plate 86 extends from the outer wall 80 radially interior with respect to the disk 20 with the outer wall 80 being between the first and second plates 84, 86. The second plate 86 extends between the airflow inlet 76 and the airflow outlet 82 to further define the airflow channel 78.

It is contemplated that the first plate 84, the second plate 86 and the outer wall 80 may be an integrally formed element or separately formed and later attached elements. The first plate 84, the second plate 86 and the outer wall 80 may be formed of various materials which may be chosen from those which are well known in the art such as plastic. In the case where such elements are integrally formed, molded plastic may be used for example.

The outer wall 80 may be disposed a various radial locations with respect to the disk 20. In this particular embodiment show, the outer wall 80 is uniformed radially spaced from the axis of rotation 38 and extends adjacent the outer edge 34 of the disk 20.

In addition, the airflow channeling enclosure 70 may include an inner wall 88 extending along the disk surface 28 from the airflow inlet 76 to the airflow outlet 82. The radial position of the inner wall 88 may be disposed at various radial positions and need not be required to be flush with the disk clamp 66 as shown. Moreover, the inner wall 88 need not be of a constant radial distance from the axis of rotation 38 as shown and may have a varying radial distance. The inner wall 88 further defines the airflow channel 78 radially exterior to the inner wall 88 with respect to the disk 20. The inner wall 88 may be formed of a filter material for modifying the disk rotation induced airflow exiting the airflow channel 78 through the inner wall 88. The inner wall 88 may be disposed at various radial locations with respect to the disk 20. In this particular embodiment shown, the inner wall 88 is uniformed radially spaced from the axis of rotation 38 and extend adjacent the disk clamp 66.

The airflow channeling enclosure 70 may include an outlet filter 90 disposed across the airflow outlet 82. The outlet filter 90 may be formed of a filter material having a porosity finer than a porosity of the filter material of the inner wall 88.

The airflow channeling enclosure 70 is configured such that disk rotation induced airflow generally enters the airflow channel 80 through the airflow inlet 76 and exits through the airflow outlet 82 and the inner wall 88. It is contemplated that contaminants may tend to become "trapped" and collected by in the airflow channel 78, in addition to a tendency of the outlet filter 90 and the inner wall 88 themselves to retain filtered contaminants. It is further contemplated that the airflow channeling enclosure 70 tends to slow the exiting disk rotation induced airflow, and therefore reduces the impact of the airflow upon the actuator arms 54 (i.e., windage). In addition where the inner wall 88 is formed of a porous material, airflow may be redirected towards the center of the disks 20, 22 as well, so as to further mitigate impingement of airflow upon the actuator arms 54 of the head stack assembly 40. Though not shown, in this embodiment, the airflow inlet 76 need not be open as shown and may be provided with a filter. The porosity of such filter would be preferably course in comparison to that of the outlet filter 90.

According to another aspect of the present invention, there is provided the disk drive 10. The disk drive 10 includes the disk drive base 16, and a disk, such as disk 20, rotatably coupled to the disk drive base 16. The disk 20 includes a disk surface, such as the upper disk surface 28, and defines the axis of rotation 38. The disk drive 10 further includes the head stack assembly 40 rotatably coupled to the disk drive base 16 adjacent the upper disk surface 28. The disk drive 10 further includes an airflow channeling enclosure, such as the airflow channeling enclosure 70, disposed adjacent to and spaced apart from the upper disk surface 28. The airflow channeling enclosure 70 includes the airflow inlet 76 configured to receive the disk rotation induced airflow therethrough. In this embodiment the airflow inlet 76 is required to be an open airflow inlet. The airflow channeling enclosure 70 further includes the airflow channel 78 extending along the disk surface 28 from the airflow inlet 76. The airflow channeling enclosure 70 further includes the outer wall 80 extending along the upper disk surface 28 from the airflow inlet 76 and defining the airflow channel 78 radially interior to the outer wall 80 with respect to the disk 20. The airflow channeling enclosure 70 further includes the airflow outlet 82 disposed upstream of the head stack assembly 40 extending from the outer wall 80 and the airflow channel 78 opposite the airflow inlet 76 for modifying the disk rotation induced airflow passing from the airflow channel 78.

As mentioned above, according to this particular aspect of the present invention, the airflow inlet 76 is required to be an open airflow inlet. In this regard, the term open refers to an absence of any filter or porous material being disposed across the airflow inlet 76. Furthermore, according to this particular aspect of the present invention, although the airflow inlet 76 is shown to be disposed downstream of the head stack assembly 40, it is not required to be disposed downstream.

The airflow channeling enclosures 70, 72, 74 may take a variety of geometric shapes and sizes. In this embodiment, the airflow channeling enclosures 70, 72, 74 each define a generally arced shape. Furthermore, the airflow inlet and outlets 76, 82 may be of various shapes, sizes and angular orientation.

Figure 6:
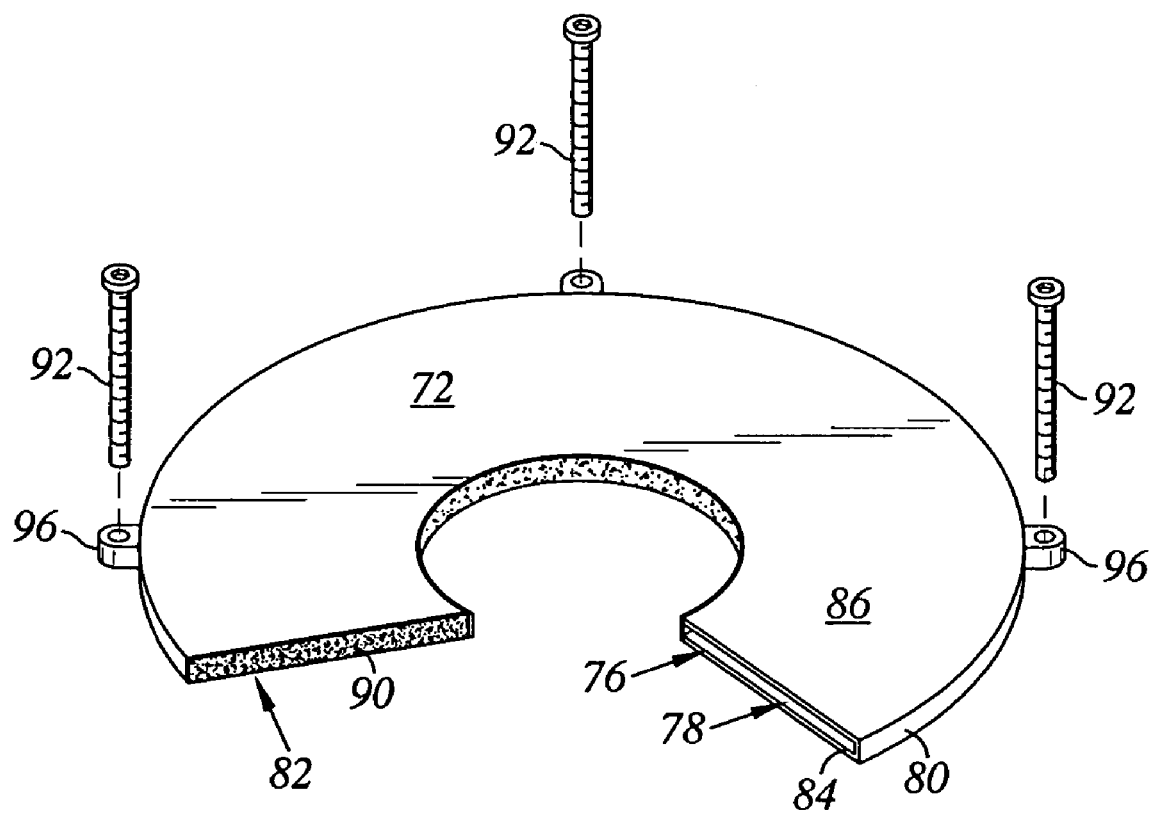
FIG. 6 is an enlarged perspective view of another airflow channeling enclosure of FIG. 1 as shown with associated fasteners.

In the embodiment shown, the airflow channeling enclosures 70, 72, 74 are supported in a variety of ways. The airflow channeling enclosure 70 is attached to the cover 18. The second plate 86 of the airflow channeling enclosure 70 may be adhesively bonded to an underside of the cover 18. As seen in FIGS. 1 and 6, the airflow channeling enclosure 72 which is disposed between the disks 20, 22 is supported by fasteners 92. In this regard, the airflow channeling enclosure 72 is similar in construction as the airflow channeling enclosure 70, however the airflow channeling enclosure 72 includes tabs 96 which are formed to receive the fasteners 92. As further seen in FIG. 1, the airflow channeling enclosure 72 is spaced apart from the airflow channeling enclosure 74 with the use of cylindrical spacers 94. The airflow channeling enclosure 74 is directly attached to the disk drive base 16 with the use of the fasteners 92. In this regard, the airflow channeling enclosure 74 includes tabs 98 which are also formed to receive the fasteners 92.

We claim:

1. A disk drive comprising:
   a disk drive base;
   a disk rotatably coupled to the disk drive base, the disk including a disk surface and defining an axis of rotation;
   a head stack assembly rotatably coupled to the disk drive base adjacent the disk surface; and
   an airflow channeling enclosure partially coextensive from the center to the radial boundary of the disk surface, the airflow channeling enclosure including: a first plate,
     an airflow inlet disposed downstream of the head stack assembly with respect to disk rotation induced airflow and configured to receive the disk rotation induced airflow therethrough;
     an airflow channel extending along the disk surface from the airflow inlet;
     an outer wall extending along the disk surface from the airflow inlet and defining the airflow channel radially interior to the outer wall with respect to the disk; and
     an airflow outlet disposed upstream of the head stack assembly extending from the outer wall an the airflow channel opposite the airflow inlet for modifying the disk rotation induced airflow passing from the airflow channel.

2. The disk drive of claim 1 wherein the first plate is formed of a solid material.

3. The disk drive of claim 2 wherein the first plate is formed of a plastic material.

4. The disk drive of claim 1 wherein the airflow channeling enclosure includes an outlet filter disposed across the airflow outlet.

5. The disk drive of claim 1 wherein the airflow channeling enclosure includes an inner wall extending along the disk surface from the airflow inlet and defining the airflow channel radially exterior to the inner wall with respect to the disk.

6. The disk drive of claim 5 wherein the inner wall is formed of a filter material for modifying the disk rotation induced airflow exiting the airflow channel through the inner wall.

7. The disk drive of claim 6 wherein the airflow channeling enclosure includes an outlet filter disposed across the airflow outlet, the outlet filter is formed of a filter material having a porosity finer than a porosity of the filter material of the inner wall.

8. The disk drive of claim 1 wherein the disk includes an outer periphery, the outer wall extends adjacent the outer periphery.

9. The disk drive of claim 1 wherein the outer wall is formed of a solid material.

10. The disk drive of claim 1 wherein the airflow channeling enclosure extends in an arc at least 180 degrees with respect to the axis of rotation of the disk.

11. A disk drive comprising:
    a disk drive base;
    a disk rotatably coupled to the disk drive base, the disk including a disk surface and defining an axis of rotation;
    a head stack assembly rotatably coupled to the disk drive base adjacent the disk surface; and
    an airflow channeling enclosure radially overlapping and partially enclosing the disk surface, the airflow channeling enclosure including: a first plate
      an open airflow inlet configured to receive the disk rotation induced airflow therethrough;
      an airflow channel extending along the disk surface from the airflow inlet;
      an outer wall extending along the disk surface from the airflow inlet and defining the airflow channel radially interior to the outer wall with respect to the disk; and
      an airflow outlet extending from the outer wall and the airflow channel opposite the airflow inlet for modifying the disk rotation induced airflow passing from the airflow channel.

12. The disk drive of claim 11 wherein the open airflow inlet is disposed downstream of the head stack assembly.

13. The disk drive of claim 11 wherein the first plate is formed of a solid material.

14. The disk drive of claim 13 wherein the first plate is formed of a plastic material.

15. The disk drive of claim 11 wherein the airflow channeling enclosure includes an outlet filter disposed across the airflow outlet.

16. The disk drive of claim 11 wherein the airflow channeling enclosure includes an inner wall extending along the disk surface from the airflow inlet and defining the airflow channel radially exterior to the inner wall with respect to the disk.

17. The disk drive of claim 16 wherein the inner wall is formed of a filter material for modifying the disk rotation induced airflow exiting the airflow channel through the inner wall.

18. The disk drive of claim 17 wherein the airflow channeling enclosure includes an outlet filter disposed across the airflow outlet, the outlet filter is formed of a filter material having a porosity finer than a porosity of the filter material of the inner wall.

19. The disk drive of claim 11 wherein the disk includes an outer edge, the outer wall extends adjacent the outer edge.

20. The disk drive of claim 11 wherein the outer wall is formed of a solid material.

21. The disk drive of claim 11 wherein the airflow channeling enclosure extends in an arc at least 180 degrees with respect to the axis of rotation of the disk.

* * * * *